UNITED STATES PATENT OFFICE.

ALFRED HOLTER, OF RJUKAN, NORWAY, ASSIGNOR TO NORSK HYDRO-ELEKTRISK KVÆLSTOFAKTIESELSKAB, OF CHRISTIANIA, NORWAY.

PROCESS OF GRANULATING NITRATE OF LIME AND SIMILAR SUBSTANCES WITHOUT DEPHLEGMATION AND DUST.

1,203,740.   Specification of Letters Patent.   Patented Nov. 7, 1916.

No Drawing.   Application filed January 6, 1914. Serial No. 810,661.

*To all whom it may concern:*

Be it known that I, ALFRED HOLTER, a subject of the King of Norway, residing at Rjukan, Norway, have invented certain new and useful Improvements in Processes of Granulating Nitrate of Lime and Similar Substances without Dephlegmation and Dust; and I do hereby declare the following to be a full, clear, and exact description of the invention, such as will enable others skilled in the art to which it appertains to make and use the same.

This invention has for its object a process of reducing nitrate of lime and other salts to a finely divided state without the formation of dust.

In the production of many materials in a coarsely pulverized state it is a great inconvenience that the same will contain much of the material in the form of powder so that the material on being further treated will make much dust. This is a very great inconvenience especially in fertilizers spread by hand, the consequence being that said fertilizers cannot be spread in windy weather as they are carried by the wind anywhere else but where they ought to be; moreover the laborers will be highly soiled, the dust will penetrate into the respiratory organs, and may thus cause diseases, etc. These inconveniences will be particularly marked if the substance is at the same time hygroscopic. It has been proposed to treat the commercial, dusty fertilizers in various ways to avoid the formation of dust, by adding oils, etc. No one however has hitherto succeeded in removing the dust in a satisfactory manner except at excessive cost.

I have now found that salts or fertilizers of the said kind, which will melt without being decomposed and which may either be anhydrous or hydrous, may be granulated in a very simple manner, if the following process is adopted:

By way of example it will be described in what manner nitrate of lime "Norgessalpeter" may be treated so as to produce a granular material perfectly free from dust and which is eminently adapted for spreading by hand.

The molten nitrate of lime concentrated to crystalline consistency is caused to flow on to a perforated bottom or plate disposed across a shaft or the like so that, on the molten mass flowing out through the perforations there will be formed sufficiently small drops of the material. Said drops will fall into the shaft. If now the size of the drops and the temperature be controlled in accordance with the length of the shaft, the drops will be solidified before reaching the bottom of the shaft. This bottom is so constructed that the grains will be removed the moment they reach the bottom.

It is not necessary that the saltpeter should be solidified into a mass of stony hardness before reaching the bottom of the shaft; it is sufficient that the solidification has come to such a point that the grains will not be sticky and form lumps. The further hardening will then take place during the transport to the storage bins.

To reduce the dimensions of the shaft, air, which may be cooled, may be forced through the same; thereby the velocity of fall of the drops will be reduced so that the greater the velocity of the air the smaller the dimensions to which the shaft has to be made. In the case of a hygroscopic substance it is of advantage to make the air, that is conducted through the shaft, circulate through a cooling apparatus, to avoid the introduction of moisture in the material, the moisture originally contained in the air being quickly absorbed by the material first passed through the air.

Likewise, to obtain a speedy solidification of the drops, some of the same substance may be added in a pulverized solid state to the liquid mass immediately before the drops are formed, which, as is well known, will assist solidification.

Since there are several substances which in a liquid condition will not stand exposure to the air, inert gases, such as for instance carbonic acid, may be used instead of air for circulation in the shaft. By reason of the circulation of the gases in the apparatus, the loss will be exceedingly slight so that but slight quantities of fresh gases will be required for covering said loss.

The molten substance under treatment may also be reduced into a state of drops in other ways than the one above described. Thus nozzles of various kinds may be used for this purpose such as tangential nozzles, in which a rotary motion is imparted to the liquid during its passage through the nozzle, or injector-shaped nozzles may be used and the fine division of the molten substance be produced by means of air under pressure or other gas. The molten mass may also be caused to flow on to rotary disks or the like thereby causing drops to be formed, before the solidification of the substance is brought about, by free motion through air or other gas.

I claim,

1. The process of granulating nitrate of lime and similar fertilizing substances without the formation of powder, which consists in forming a melt of the substance, and when the substance is in condition for crystallization producing granules or drops thereof of crystalline consistency, and effecting the hardening of such drops by causing them to move freely through an inert gaseous atmosphere.

2. The process of granulating nitrate of lime and the like without the formation of powder, which consists in forming a melt thereof, and when sufficiently concentrated for crystallization producing granules or drops of said molten salt, and causing such drops to move freely in a counter current with a suitable inert gas.

3. The process of granulating nitrate of lime and the like without the formation of powder, which consists in forming a melt thereof, and when sufficiently concentrated for crystallization producing granules or drops of said molten salt and causing such drops to move freely in counter current with air.

4. The process of granulating nitrate of lime and the like without the formation of powder, which consists in forming a melt thereof, and when in condition for crystallization producing granules or drops of said molten salt, and causing such drops to move freely in counter current with a suitable inert gas, said gas being maintained in circulation.

5. The process of granulating nitrate of lime and the like without the formation of powder, which consists in forming a melt thereof, and when in condition for crystallization producing granules or drops of said molten salt, and causing such drops to move freely in counter current with a suitable inert gas, said gas being maintained in circulation while being cooled.

6. The process of granulating nitrate of lime and similar substance, which consists in producing a melt thereof and adding to this melt a solid pulverized salt, forming the melt into drops and immediately thereafter causing the drops or granules so produced to move freely in a counter current with a suitable inert gas.

7. The process of granulating fertilizers capable of being melted, which comprises forming a melt of the substance, causing the melt to be in condition for crystallization, producing drops or granules of the melt and causing said drops to move freely through a current of a dry cooling gas counter to the movement of the drops, said current of gas being of sufficient force to retard the fall of said granules.

8. The process of granulating fertilizers capable of being readily melted, which comprises forming a melt of the substance, producing drops or granules of the melt, causing said drops to freely fall through a counter current of a dry inert gas, and circulating the gas through the path of the falling drops, and cooling the gas at a point of its circuit outside of the path of the drops.

9. The process of granulating nitrate of lime, which comprises forming a melt thereof, mixing therewith finely divided nitrate of lime to initiate crystallization, immediately thereafter producing drops or granules of the melt and causing them to freely move through a drying and cooling atmosphere.

10. The process of granulating nitrate of lime, which comprises producing a melt thereof, and when the melt is in condition for crystallization forming drops of the melt, and causing said drops to freely move through a dry cooling atmosphere, and maintaining the product dry.

11. A fertilizer containing crystalline nitrate of lime, said fertilizer being in small globules for ready distribution by hand.

In testimony that I claim the foregoing as my invention, I have signed my name in presence of two subscribing witnesses.

ALFRED HOLTER.

Witnesses:
 M. GUTTENERREN,
 RUTH LINDSTRÖM.